Figure 1:
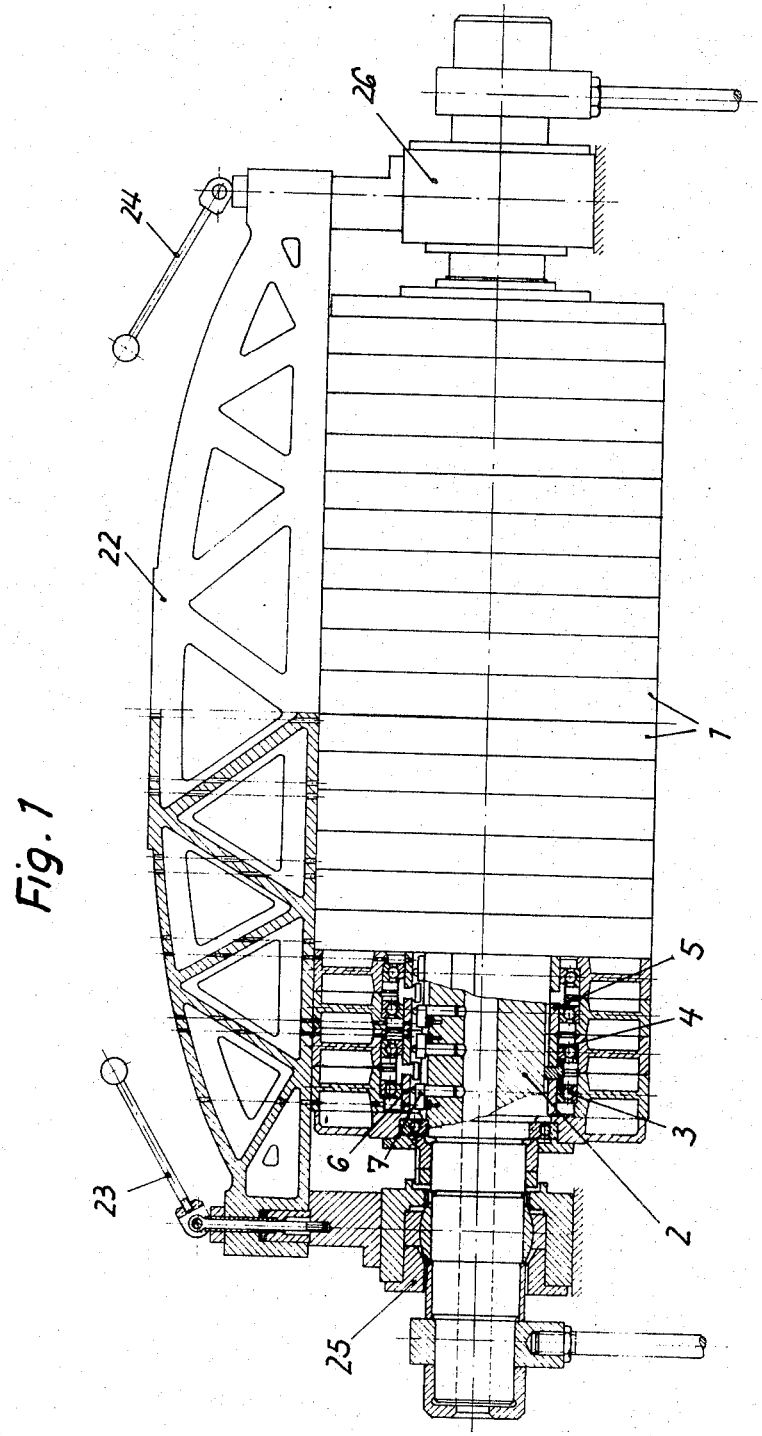

United States Patent [19]
Rodach et al.

[11] 3,850,032
[45] Nov. 26, 1974

[54] ROLLER ASSEMBLY FOR DEFLECTING A STRIP AND FOR MEASURING THE TENSION OF SAID STRIP AT DIFFERENT POINTS SPACED ACROSS THE WIDTH OF SAID STRIP

[75] Inventors: Alexander Rodach, Pforzheim; Hans Weber, Engelsbrand uber Neuenburg, both of Germany

[73] Assignee: Frau Irma Ungerer, Pforzheim, Germany

[22] Filed: Feb. 2, 1973

[21] Appl. No.: 329,221

[30] Foreign Application Priority Data
Apr. 8, 1972  Germany.......................... 2217007

[52] U.S. Cl. ................................................ 73/144
[51] Int. Cl. ............................................. G01l 5/10
[58] Field of Search ...................................... 73/144

[56] References Cited
UNITED STATES PATENTS
3,413,846  12/1968  Flinth.................................... 73/144
3,557,614  1/1971  Muhlberg............................. 73/144

FOREIGN PATENTS OR APPLICATIONS
1,169,381  11/1969  Great Britain....................... 73/144

Primary Examiner—Charles A. Ruehl

[57] ABSTRACT

A plurality of juxtaposed rings are rotatably mounted on a stationary axle and are engageable by said strip and adapted to deflect the same. A plurality of bearings surround said axle and are surrounded each by one of said rings. Each of said bearings comprises an inner race facing said axle. A plurality of springs surround said axle and are surrounded each by said inner race of one of said bearings. Each of said spring rings has a mounting portion secured to said axle and an engaging portion which is opposite to said mounting portion and has a radially inner side and a radially outer side, which engages the associated inner race. A plurality of pressure gages are provided, each of which is disposed between said axle and said engaging portion of one of said spring rings and engages said engaging portion on the radially inner side thereof.

5 Claims, 3 Drawing Figures

ROLLER ASSEMBLY FOR DEFLECTING A STRIP AND FOR MEASURING THE TENSION OF SAID STRIP AT DIFFERENT POINTS SPACED ACROSS THE WIDTH OF SAID STRIP

This invention relates to a deflecting roller for measuring the tension of a strip at different points spaced across the width of the strip, particularly for measuring the tension of metal strip in strip-processing and -straightening plants, which roller comprises juxtaposed rings, which are rotatably mounted on a stationary axle, and pressure gages at the bearings of said rings.

In strip-processing plants, particularly in straightening plants, the strip tension may be measured by individual measurements at different points spaced across the width of the strip in order to ascertain the quality of the strip in several zones so that additional straightening steps can be carried out in order to achieve a more uniform quality of the strip. Such measurements are carried out on deflecting rollers, which are divided into pressure-measuring rings, which are rotatably mounted on a stationary axle. The pressure gages previously used on such rings virtually do not permit of an adjustment of all rings to a common zero value so that the results of measurement are inherently falsified and the results which are obtained are inadequate in view of the quality of the sheet metal which is required today.

A deflecting roller for measuring the strip tension at different points spaced across the width of the strip, particularly for measuring the tension of metal strip in strip-processing and -straightening plants, comprises juxtaposed rings, which are rotatably mounted on a stationary axle and provided with pressure gages at their bearings and is characterized according to the invention in that a spring ring is interposed between the mounting axle and the inner race of each bearing, and said spring ring has an engaging portion, which is disposed adjacent to the strip-contacting portion of the deflecting ring and on one side contacts the bearing race and on the other side is engaged by a pressure gage, the spring ring is secured to the mounting axle at a point which is opposite to the engaging portion of the spring ring, the pressure gage comprises a displacement-transmitting pin, which is held under spring action against an annular stop, and an armature connected to said pin and extending into an adjustable coil. With this arrangement, all pressure-measuring rings can be individually adjusted relative to each other to a common base value (zero value). For this purpose, an adjusting straightedge can be applied to the juxtaposed deflecting rings, which are provided with respective bearings, so that the application of the straightedge results in an adjustment of the coils relative to the associated armatures. In this way, the associated pressure gages can be adjusted to zero from the outside.

Figure 2:
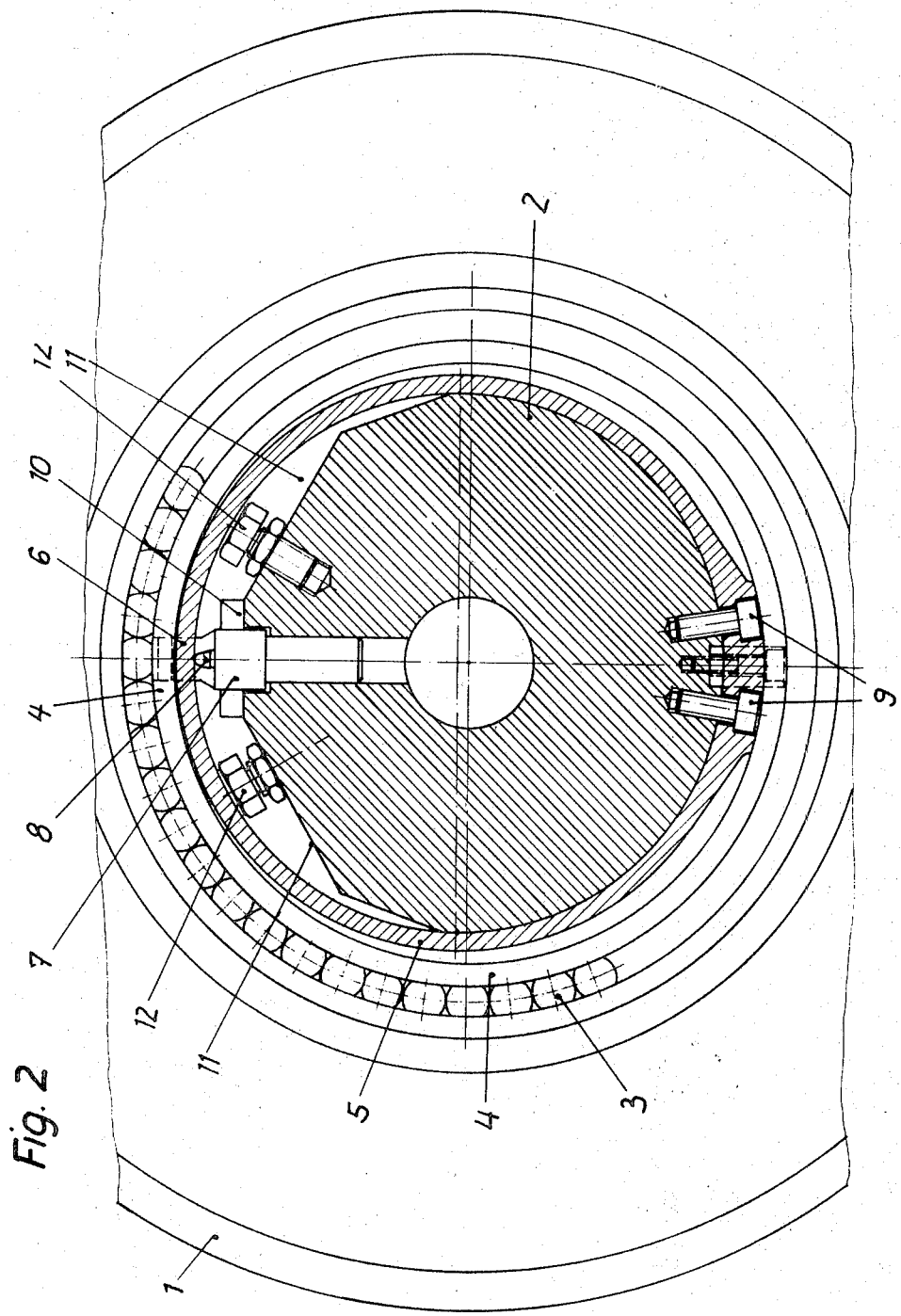
Figure 3:
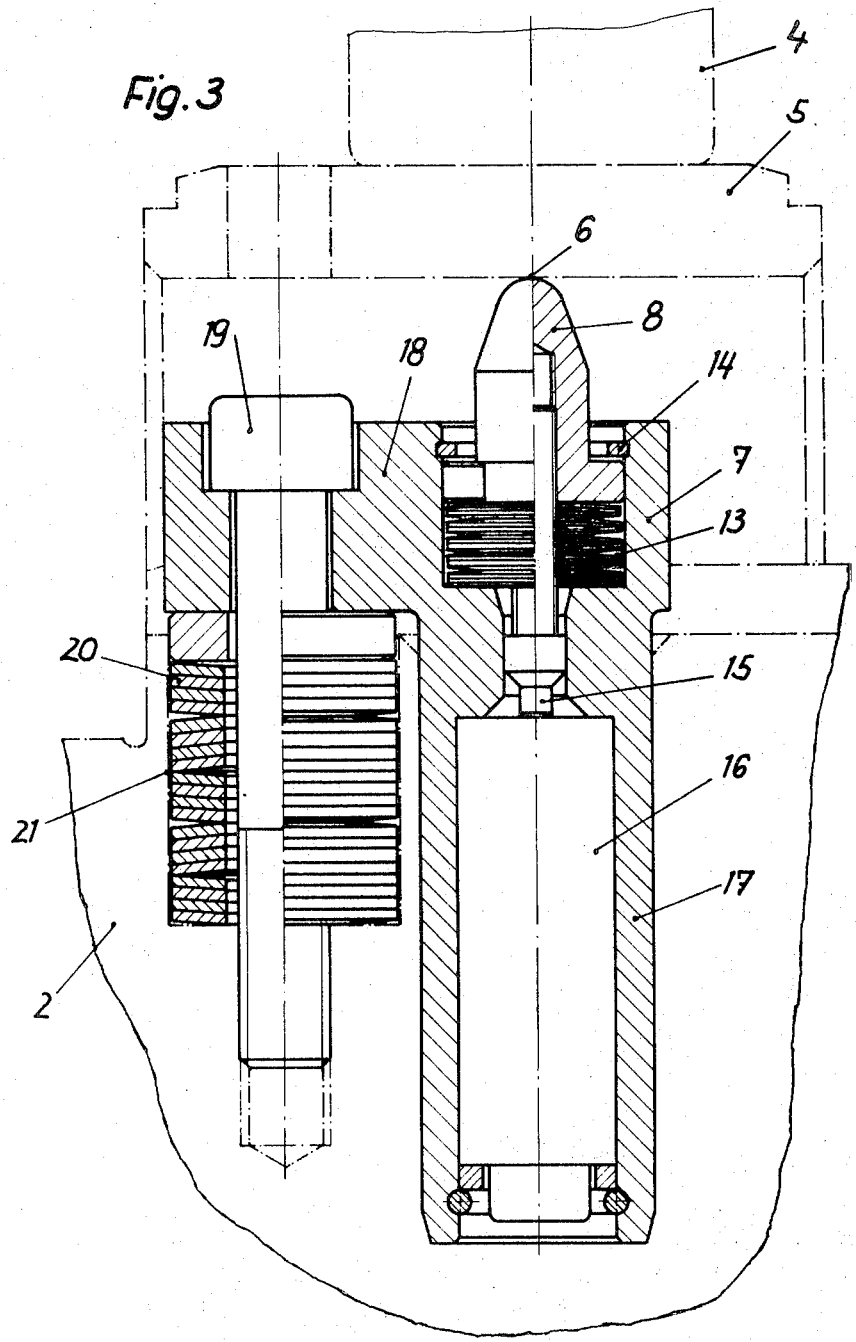

Further details of the deflecting roller according to the invention for measuring the tension of a strip at different points spaced across the width of the strip will be described by way of example with reference to the drawings, in which FIG. 1 is an elevation showing a deflecting roller according to the invention, partly in longitudinal section, FIG. 2 is a transverse sectional view showing the deflecting roller of FIG. 1 and FIG. 3 is a partly sectional view showing the pressure gage of FIG. 2.

As is apparent from FIGS. 1 and 2 of the drawing, the deflecting roller comprises several deflecting rings 1, which are juxtaposed and rotatably mounted by means of rolling element bearings 3 on a stationary axle 2. A spring ring 5 is disposed between the mounting axle 2 and the inner race 4 of each rolling element bearing 3. This spring ring 5 has an engaging portion 6, where the ring on one side engages the inner race 4 of the bearing and on the other side is engaged by a displacement-transmitting pin 8 of a pressure gage 7. Opposite to the engaging portion 6, the spring ring 5 is secured at 9 to the mounting axle 2, which is flattened at 10 to receive the pressure gage 7. Overload-preventing stops 12 are mounted on oblique flats 11 on both sides of the mounting axle 2 and limit an excessive deformation of the spring ring 5 in case of an overload and also protect the pressure gages 7. As is apparent from FIG. 2, the spring ring 5 can be elastically deflected in response to the pressure which is transmitted from the sheet metal strip through the deflecting rings 1 to the inner races 4 of the bearings. This deflection of the spring ring results in a corresponding movement of the displacement-transmitting pin 8. The spring ring 5 springs back automatically and independently of the pressure gage 7.

In accordance with FIG. 3, the pressure gage 7 comprises the displacement-transmitting pin 8, which is urged by a spring 13 against an annular stop 14 and is provided with an armature 15, which extends into the coil 16. The displacement-transmitting pin 8 is held by the action of the spring 13 against the annular stop 14. The pin 8 and the coil 16 are mounted in a housing 17 which has a portion 18. By bolts 19 surrounded by coil springs 20 the portion 18 is radially adjustably mounted in recesses 21 formed in the mounting axle 2. By a suitable manipulation of the pressure-applying levers 23, 24 connected to the bearings 25, 26, an adjusting straightedge 22 can be caused to engage the juxtaposed deflecting rings 1, which are provided with separate bearings. When said straightedge engages the deflecting rings, the respective pressure gages 7 can be adjusted to zero for example by changing the adjustment of bolts 19 by a long-handled tool. As a result, the pressure values indicated throughout the width of the deflecting roller consisting of the several deflecting rings 1 will be comparable.

What is claimed is:

1. A roller assembly having strip-deflecting and strip tension-measuring properties, comprising
   a stationary axle,
   a plurality of juxtaposed rings rotatably mounted on said axle and having each a strip-contacting and deflecting portion,
   a plurality of bearings, each of which surrounds said axle and is surrounded by one of said rings and comprises an inner race facing said axle,
   a plurality of spring rings, each of which surrounds said axle and is surrounded by said inner race of one of said bearings and has a mounting portion secured to said axle and an engaging portion which is opposite to said mounting portion and has a radially inner side and a radially outer side, which engages the associated inner race adjacent to said strip-contacting portion of the associated deflecting ring, and a plurality of pressure gages, each of which is disposed between said axle and said engaging portion of one of said spring rings and engages said engaging portion on the radially inner side thereof.

2. A roller assembly as set forth in claim 1, in which said axle is formed with oblique flats on circumferentially opposite sides of each of said pressure gages and overload-preventing stop means are mounted on said flats and engageable by said spring rings to limit the deformation thereof so as to prevent an overloading of said spring rings.

3. A roller assembly as set forth in claim 1, in which each of said pressure gages comprises a coil, an armature extending into said coil, a displacement-transmitting pin connected to said armature, spring means urging said pin away from said coil, and an annular stop limiting the movement of said pin away from said coil.

4. A roller assembly as set forth in claim 3, in which each of said pressure gages comprises a housing which carries said annular stop and in which said displacement-transmitting pin is movably mounted, a plurality of radially extending, threaded fasteners are provided, which are threaded into said axle, each of said housings being secured to said axle by at least one of said threaded fasteners, and a plurality of coiled compression springs are provided, each of which surrounds one of said threaded fasteners and is compressed between the associated one of said housings and said axle, whereby said fastener is operable to adjust the position of said housing in a radial direction with respect to said axle.

5. A roller assembly as set forth in claim 1, which comprises a straightedge-mounting structure carried by said axle, a straightedge mounted on said mounting structure and extending in the longitudinal direction of said axle radially outwardly of said deflecting rings and facing the same and, means for moving said straightedge into engagement with all said deflecting rings to provide a reference position thereof.

* * * * *